United States Patent [19]

McKee et al.

[11] 3,767,089

[45] Oct. 23, 1973

[54] APPARATUS FOR DEPOSITING DISCRETE ARTICLES, SUCH AS RAISINS, UPON A CARRIER

[75] Inventors: Oather D. McKee, Ooltewah; Robert L. Whitmill, Collegedale, both of Tenn.

[73] Assignee: McKee Baking Company, Collegedale, Tenn.

[22] Filed: July 7, 1971

[21] Appl. No.: 160,308

[52] U.S. Cl. .................. 222/221, 222/222, 222/226
[51] Int. Cl. ............................................ G01f 11/20
[58] Field of Search ............................ 118/2.4, 2.5; 99/450.1, 450.6, 450.7; 221/200, 201, 225, 233, 234, 236; 141/190; 53/160; 222/216, 218, 221, 222, 226, 227, 231, 236, 252, 254, 265, 271, 276, 367, 368

[56] References Cited
UNITED STATES PATENTS

| 709,796 | 9/1902 | McGinnity | 222/218 |
|---|---|---|---|
| 780,757 | 1/1905 | Lockwood | 141/190 X |
| 1,137,128 | 4/1915 | Geyer | 222/276 |
| 1,497,576 | 6/1924 | Moling | 221/20 X |
| 2,888,963 | 6/1959 | Guyer | 222/221 X |
| 2,566,712 | 9/1951 | Zeon | 99/450.1 |

FOREIGN PATENTS OR APPLICATIONS

| 1,193,729 | 11/1959 | France | 222/221 |

*Primary Examiner*—Robert B. Reeves
*Assistant Examiner*—Larry Martin
*Attorney*—Roylance, Abrams, Berdo & Kaul

[57] ABSTRACT

An apparatus deposits discrete articles such as raisins upon an endless belt or upon objects such as unbaked cookies carried on the endless belt. The apparatus contains a storage hopper in which the discrete objects are stored until they are discharged into pockets on a rotating cylinder, disposed adjacent to the outlet of the storage hopper. The cylinder is rotated to a position where the discrete articles within the pockets thereof are forced out of the pockets by the movable bottom portions of the pockets. The discrete articles from the pockets fall into a hopper means which is located directly above a moving carrier, such as an endless belt, the hopper means having controllable door means which permits the hopper to be opened so the articles therein can fall upon the belt or upon the unbaked cookies being conveyed upon the belt.

19 Claims, 5 Drawing Figures

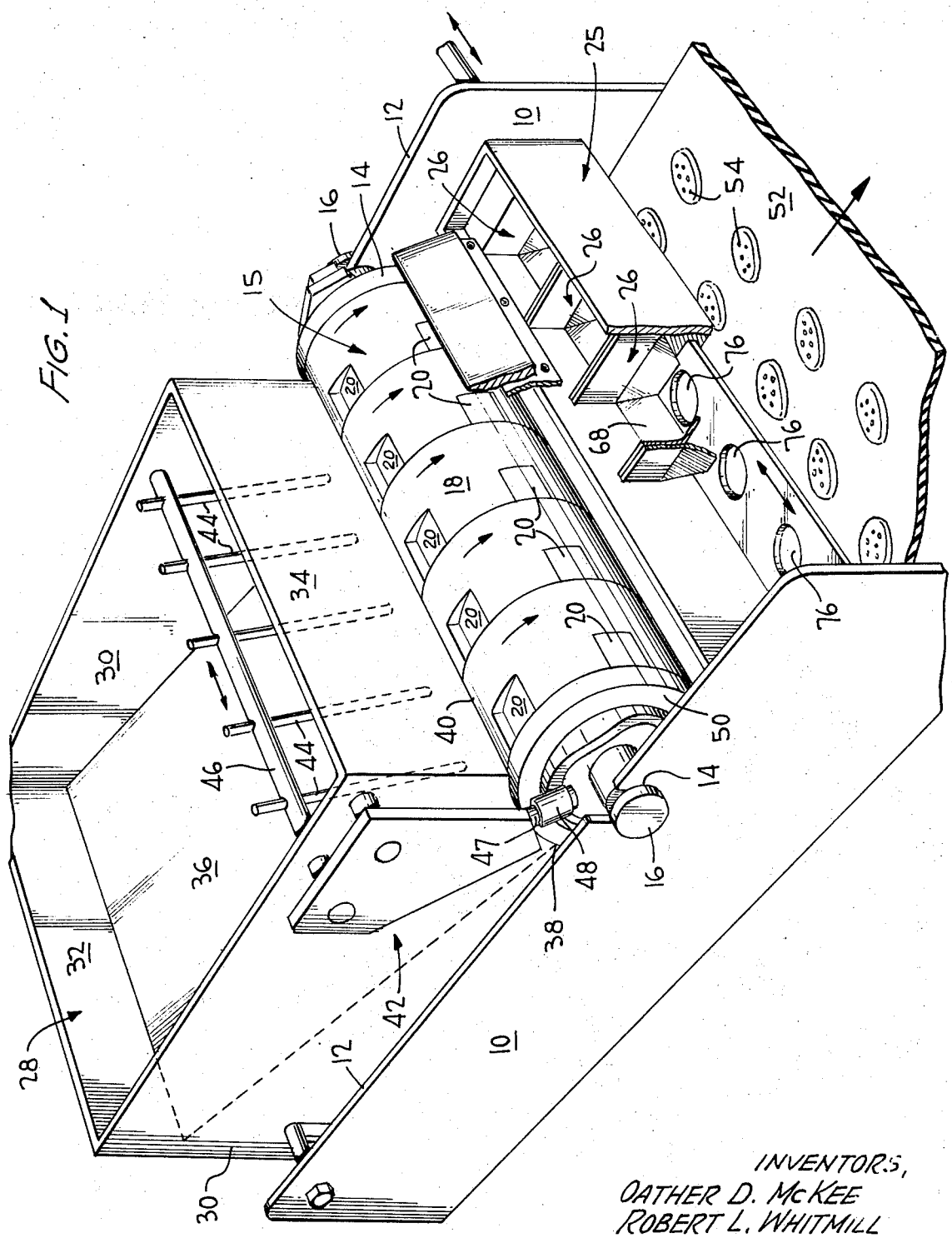

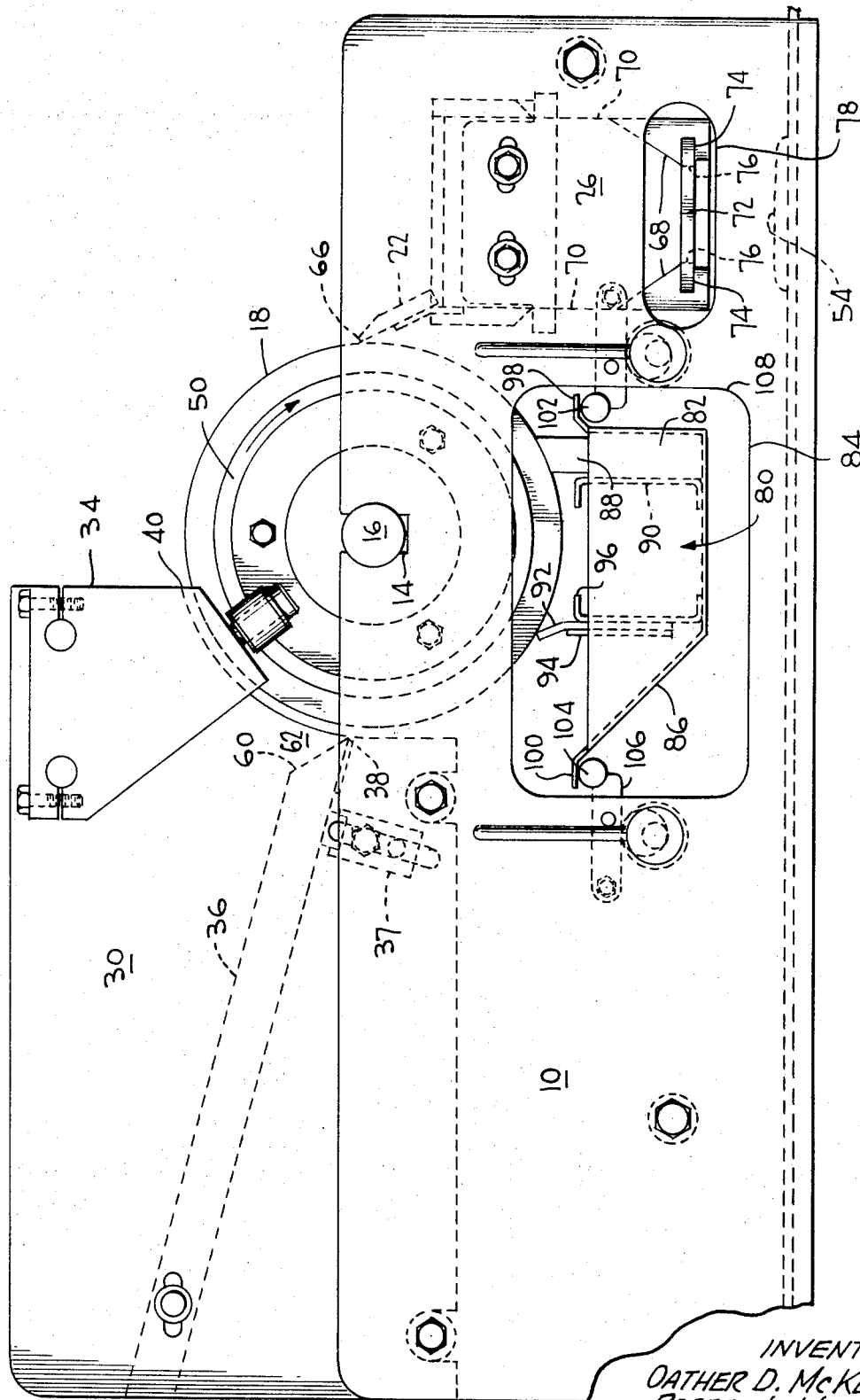

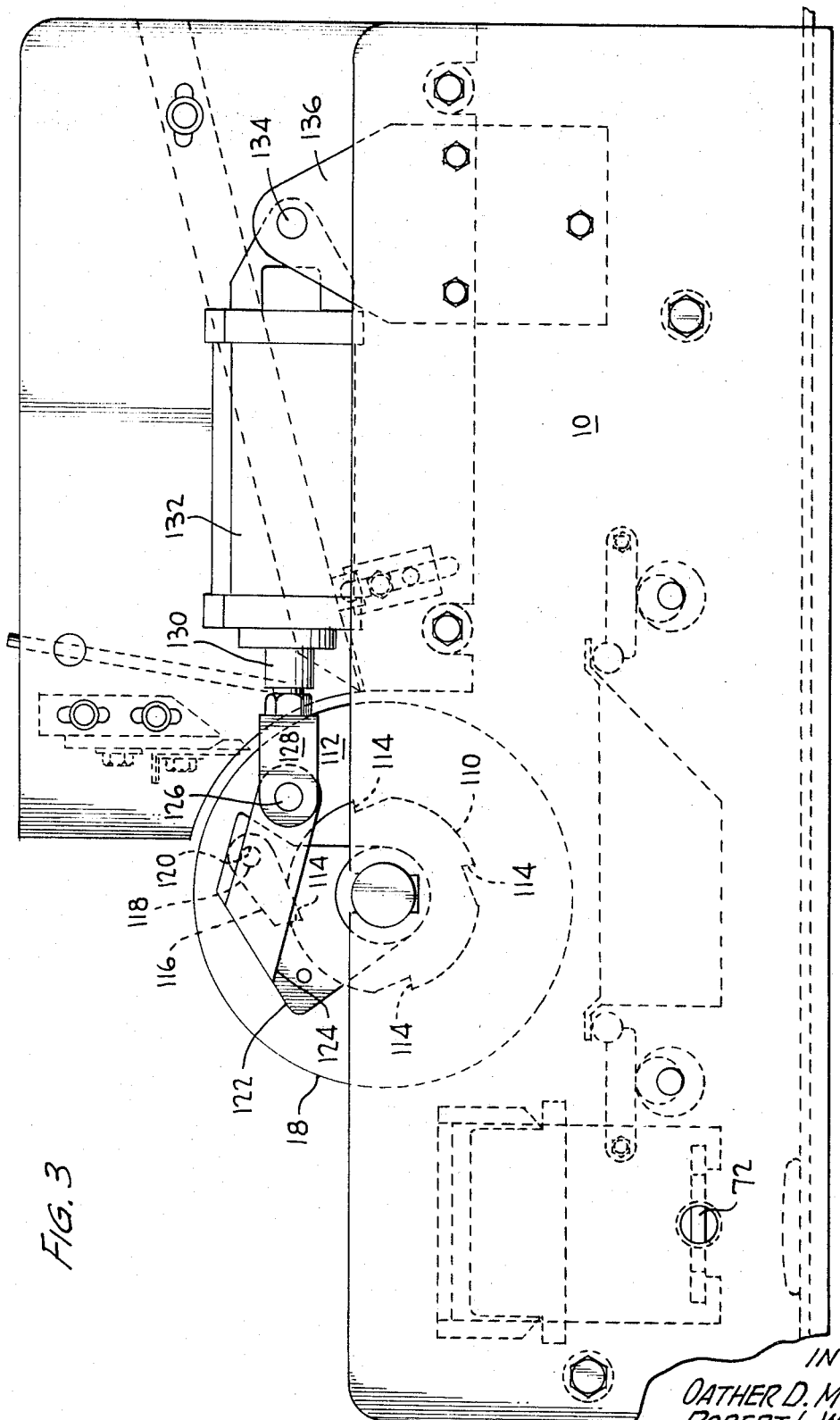

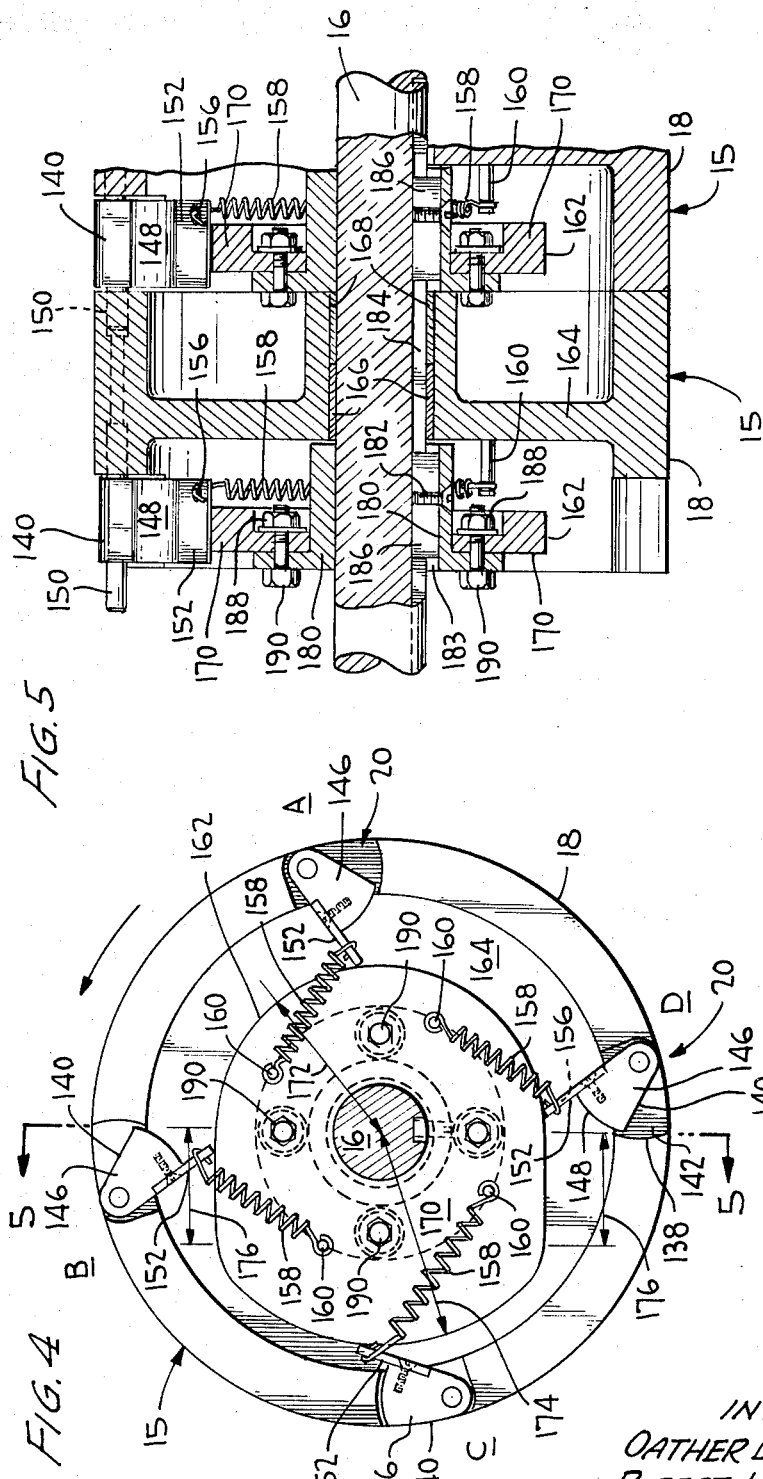

APPARATUS FOR DEPOSITING DISCRETE ARTICLES, SUCH AS RAISINS, UPON A CARRIER

This invention relates generally to the field of material handling and more particularly it relates to the handling and depositing of discrete objects upon a transfer conveyor. The invention finds particular utility in the field of depositing toppings, such as raisins, upon articles, such as cookies, being conveyed upon an endless conveyor belt.

In the past, a number of known techniques have been employed within the baking industry for placing raisins, nuts and other toppings upon cookies and other articles to be baked. Because raisins, in particular, tend to stick together when accumulated as a mass, one approach has been to use the raisins in a form that does not stick together, namely, using dried raisins rather than fresh and moist raisins. This particular approach, however, is not particularly successful because the placing of a dried raisin upon a cookie which has not yet been baked will usually result in the burning of the raisin in the baking process. The resultant burnt raisin not only is unattractive but also gives the cookie an undesirable taste.

A second approach for placing raisins upon cookies has been to employ laborers for placing the raisins upon the cookies by hand before they enter the cooking ovens. This particular approach does have several drawbacks which include additional health hazards and the high cost of manual labor to perform simple functions which might better be performed by machine, if such a machine were available and economical.

In light of the foregoing problems in connection with known approaches for dispensing raisins, it is a particular object of the present invention to provide an apparatus which is primarily designed for the handling and dispensing of predetermined amounts of discrete particles, such as raisins.

Another object of the present invention is to provide a raisin topper which can easily and inexpensively be installed in conjunction with existing baking equipment.

It is another object of the present invention to provide a unique dispensing apparatus for the dispensing of moist objects which may tend to stick together.

It is an additional object of the present invention to provide an apparatus capable of automatically placing toppings upon baked goods without the necessity of employing manual labor to accomplish the same.

The foregoing objects are attained by providing apparatus including a hopper into which the raisins or other topping material are placed. A circular cylinder which has a plurality of pockets therein is disposed adjacent to the hopper outlet. The material contained within the hopper is caused to vibrate by a vibrating means and, thus, a certain amount of material from within the hopper will discharge therefrom into the open pockets upon the cylinder. The cylinder is periodically rotated about its axis to permit empty pockets to be filled by material which discharges from the hopper. One of the sides of the hopper cooperates with the cylinder to break apart any agglomerated material and to permit only the contents within the pockets to leave the hopper. When the cylinder reaches its discharge position, the bottom side of the pockets moves upwardly and discharges the contents of the pockets into separate bins positioned over a moving conveyor. Periodically, the bin outlet doors are allowed to open and the contents therein will fall upon the belt or items riding upon the belt.

The foregoing objects, features and advantages of the present invention will become more apparent from the following detailed description of a preferred embodiment thereof, considered in conjunction with the annexed drawings which form a part of the original disclosure in which:

FIG. 1 is a perspective view of the article dispensing apparatus of the present invention;

FIG. 2 is a side elevational view thereof;

FIG. 3 is an opposite side elevational view thereof;

FIG. 4 is a cross-sectional view of the pocketed cylinder used in the apparatus; and FIG. 5 is a sectional view taken along line 5—5 of FIG. 4.

The article dispensing apparatus of the present invention as shown in FIG. 1 comprises a pair of spaced side support members 10, each support member being substantially planar and spaced apart to form two essentially parallel upstanding planar walls. Along the top edges 12 of each side support member 10 is a notch 14 into which opposite ends of a cylinder shaft 16 are positioned. The notches 14 in the top edge 12 of each support member 10 are located so that the cylinder shaft 16 is positioned perpendicularly to each of the side wall support members 10. The cylinder shaft 16 is fixedly attached to each side wall support member 10 having parallel flats machined on opposite sides which are engaged by notches 14.

A cylinder generally designated 15 is rotatably mounted upon the cylinder shaft 16 and the cylindrical surface 18 of the cylinder is formed as a continuous surface of revolution, interrupted only by a plurality of pockets 20 which are positioned along the cylindrical surface. The pockets 20 are arranged in straight lines which are parallel to the axis of rotation of the cylinder 18 and extend along the length of the cylinder in four equally spaced rows, off-set 90° from each other.

As the cylinder 15 and its surface 18 rotate in the direction shown in FIG. 1, the surface comes in contact with a scraper 22 which is fixedly attached at each end to the side support members 10. Scraper 22 has a leading edge 66 which is in scraping contact with the cylindrical surface 18. As the pockets 20 rotate toward the scraper 22, the bottom of each pocket 20 moves upwardly, in a manner to be described hereinafter, and discharges the articles contained within each pocket 20. The articles so discharged will be deflected off of the scraper 22 and into a hopper means generally designated 25, which includes a separate hopper 26 for each pocket 20 in each row of pockets.

An article storing hopper generally designated 28 is positioned adjacent the side of cylinder 15 and includes two side walls 30, a rear wall 32, a front wall 34 and a sloping hopper bottom 36. The article storing hopper 28 has a generally rectangular shaped open top formed by the side walls 30, the rear wall 32 and the front wall 34. The side walls 30 are secured to side support members 10 which thus give support to the other parts of the article storing hopper 28. The sloping hopper bottom 36 extends downwardly from rear wall 32 toward cylindrical surface 18 and also in a generally forward direction toward front wall 34. The sloping hopper bottom 36 terminates at an edge 38 which is extremely close to cylindrical surface 18 but which is remote from the lower edge 40 of front wall 34 which also is close to cylindrical surface 18. Because the edge 38 of the sloping hopper bottom 36 and the edge 40 of the front wall 34 are positioned to almost contact cylindrical surface 18 at different points, arcuately spaced apart from each other, the article hopper 28 has an outlet opening through which articles can discharge to contact against the cylindrical surface 18. The hopper outlet is thus an opening defined and circumscribed by a top edge 40, a bottom edge 38 and side edges at the inner terminus of the side walls 30.

When pockets 20 are positioned adjacent the outlet of hopper 28, some of the articles contained within the article hopper 28 will discharge into the pockets 20. As the cylindrical surface 18 rotates in the direction shown, the pockets 20 and the articles contained therein will pass under the lower edge 40 of front wall 34. When the articles are moist raisins or other items which tend to agglomerate, there is a tendency for some excess articles to stick or adhere to those already deposited in the pockets 20. However, as the filled pockets 20 move past the edge 40, such edge scrapes away the excess articles to prevent any articles, other than those disposed within the pockets 20, from discharging from the hopper 28.

In order to facilitate the filling of the pockets when they are aligned with the outlet of hopper 28, an agitator device, shown generally as 42, is provided to minimize or to prevent entirely the tendency of the articles within hopper 28 to agglomerate or stick together. The agitator device 42 has a plurality of arms 44 extending downwardly within hopper 28 from support arm 46. The ends of the support arm 46 extend through each side wall 30 and the arm 46 is positioned generally parallel to cylindrical shaft 16. Extending downwardly from adjacent one end of the support arm 46 is an extension 47 which carries a cam follower 48 which contacts cam surface 50 on one end of the cylinder 15. As the cylinder 15 rotates, cam surface 50 also rotates in the same direction and imparts a back-and-forth motion to the cam follower 48, which motion is transferred by the extension 47 to support arm 46. The back-and-forth motion of the support arm 46 causes the comb-like arms 44 to move within hopper 28 to minimize the tendency of the articles stored therein to agglomerate or stick together. The extension 47 can be disposed outside the side wall 30 or can be disposed within the hopper 28, but projecting through the outlet thereof.

In order to further prevent article agglomeration and to assist the movement of articles within hopper 28 toward the outlet thereof for filling of pockets 20 within cylindrical surface 18, the hopper bottom 36 has a vibrating means not shown but attached to 36 therewith to vibrate the whole hopper bottom 36 and cause the raisins or other articles resting thereon to vibrate themselves. This vibratory motion is desirable because it helps to prevent the articles contained within hopper 28 from agglomerating or sticking together and further helps feed such articles toward the outlet for discharge into the pockets 20.

Once the hopper means has been at least partially filled, by emptying the articles from the pockets 20 into each of the individual hoppers 26, the articles are then in a position for dropping upon a conveyor 52, advantageously in the form of an endless belt, which is moving in the direction shown underneath the hoppers 26.

Upon the endless belt 52 are articles such as unbaked cookies 54 which are placed in rows perpendicular to the direction of motion of endless belt 52 by a cookie making machine positioned adjacent endless belt 52 in advance of the raisin topper. When the cookies are positioned directly beneath hoppers 26, the bottom doors 72 of each of these hoppers 26 are opened simultaneously to allow the contents therein to fall upon the cookies below. The hopper door opening mechanism operates in timed relationship with the remotely located cookie making machine and is timed according to the speed at which the machine places the cookies upon the endless belt 52 and also according to the speed of travel of the cookie dough upon endless belt 52. After the hoppers 26 have been emptied, the hopper doors 72 are closed to permit the hoppers 26 to receive raisins and the like from the pockets 20 upon cylindrical surface 18.

After the contents of each hopper 26 have been dropped onto the unbaked cookies 54 upon the endless belt 52, the cylinder 15 is rotated via a mechanism to be described hereinafter so that each of the hoppers 26 will again be filled as the pockets 20 empty thereinto. It can be readily seen, therefore, that the article dispensing apparatus of the present invention is capable of removing a few discrete articles such as raisins from a bin full of such articles and placing these removed articles upon an object such as cookie dough positioned on a travelling conveyor. While the preferred embodiment of the present invention operates to place moist raisins upon unbaked cookies, the apparatus might also be employed for the placing of nuts or chocolate chips upon pieces of cookie dough, or for dispensing discrete items to be packaged into open-topped containers travelling on a conveyor belt.

A greater understanding of the present invention can be obtained by referring to FIG. 2 wherein raisins, which are the articles employed in the preferred embodiment of the present invention, are deposited into the hopper 28 to fill the area between side wall 30, rear wall 32, front wall 34, hopper bottom 36 and cylindrical surface 18. The hopper bottom 36 has an inclined front end portion 60 which tapers downwardly toward the leading edge 38 and the cylindrical surface 18. This causes the raisins resting upon the portion 60 to gravitationally slide toward the hopper outlet. When the pockets 20 in cylindrical suraface 18 are aligned with the outlet of the hopper 28, which has been previously defined, and which can be designated as 62, the raisins within hopper 28 will readily enter the open pockets, under the influence of gravity and the influence of the vibrating means. If any raisins adhere to those raisins already within a pocket, such excess raisins outside of the pocket will be scraped away from those inside the pocket by the scraping action of the bottom edge 40 of front wall 34 as the pocket moves thereunder. As the cylinder rotates in the direction shown, the filled pockets 20 will discharge their contents substantially when such pockets reach the leading edge 66 of the scraper bar 22. The raisins then fall downwardly onto scraper 22 and into hoppers 26. Scraper 22 is preferably made of a plastic material, such as Teflon (polytetrafluoroethylene), and it projects above and is rigidly attached to the hoppers 26 and extends along the length of the cylinder surface 18 in a direction wherein its leading edge 66 is parallel to the axis of rotation of the cylinder 15. The scraper leading edge 66 is in sliding contact with cylindrical surface 18 and operates to scrape away any materials which have adhered to cylindrical surface 18.

Each hopper 26 has a pair of opposed inwardly slanting bottom wall portions 68 which extend from the generally vertical side wall portions 70 thereof to form a funnel-like bottom section to each hopper, such section being open at the bottom but normally closed by the sliding floor 72. This funnel-like configuration concentrates all of the raisins at the bottom section of the hopper into a small area to permit a more precise deposition of raisins from hoppers 26 onto the unbaked cookies 54 travelling beneath each hopper 26.

At the bottom of each hopper 26 is a sliding floor 72 which is supported in slots 74 formed in at least the outside walls of the hopper means 25 to permit the floor to slide beneath the hopper bottoms in a direction which is generally perpendicular to side support members 10. Sliding floor 72 has a plurality of spaced openings 76 passing therethrough, the edges of these openings indicated by dotted lines in FIG. 2. These openings are spaced apart along the sliding floor 72 at locations which are non-aligned with the hopper bottoms, thus permitting each hopper 26 to be closed when sliding floor 72 is in one position, but which are aligned with the hopper bottoms when the sliding floor 72 is moved into a second position. There is a hole 78 in at least one side support member 10 which allows the sliding floor 72 to be moved or removed by sliding the floor 72 in a direction perpendicular to side support member 10. As was mentioned earlier, the apparatus for sliding the floor 72 and opening the hoppers 26 operates in timed relationship with a remote cookie making machine and the speed of the endless belt 52 carrying the cookies formed by the machine. Sliding floor 72 will move laterally to open each hopper 26 to allow the raisins contained therein to fall downwardly at the time that a row of unbaked cookies 54 is positioned therebelow upon the endless belt 52. Suitable means for laterally moving the floor would be a solenoid or pneumatic cylinder having a laterally movable plunger connected to the floor 72.

A water reservoir, shown generally as 80, which has a generally vertical front wall 82, a generally horizontal bottom wall 84 and a generally sloping rear wall 86, is positioned beneath the cylinder 15. The reservoir 80 additionally includes two side walls, not shown, each side wall being disposed in a plane substantially parallel to side support members 10 and positioned close enough to the side support members 10 that water reservoir 80 will occupy a position beneath the entire length of the cylinder 15.

Extending from the bottom 84 of water reservoir 80 along substantially the whole length of the cylinder 15 is a wick 88 which is in contact with cylindrical surface 18 and which serves to wash and clean the cylindrical surface 18 as it rotates in the direction shown. The wick 88 is supported in a vertical position against front wall 82 by a wick support means 90 which could be a plurality of rigid wire members attached to bottom 84.

Once the cylindrical surface 18 has rotated past wick 88, the cylindrical surface 18 will be wet and the excess water must be removed. The removal of excess water is accomplished by a squeegee 92 which is made of a flexible material, such as rubber, and which extends along the length of cylindrical surface 18. Squeegee 92 is mounted in a vertical position between two squeegee support members 94 and 96, squeegee support member 94 being a solid member extending between the ends of water reservoir 80 and in a plane parallel to front wall 82 and perpendicular to the side walls of the water reservoir 80. Squeegee 92 is in abutting contact with the cylindrical surface 18 to scrape the excess water from the cylindrical surface and permit the excess water to fall back into water reservoir 80.

Water reservoir 80 has a front flange 98 and a rear flange 100 which extend along the length of the water reservoir 80 and rest upon support rods 102 and 104, respectively, which extend from a side support member 10 to support members 106 which are rigidly attached to the other side support member 10. An opening 108 in the side support member 10 permits the water reservoir 80 to be completely removed from under cylindrical surface 18 in order that the wick 88 or the squeegee 92 might be replaced, or the water changed. The reservoir 80, of course, is supported by the rods 102 and 104.

An escapement mechanism for rotating cylindrical surface 18 is shown in FIG. 3. The mechanism includes a ratchet 110 mounted to an end surface 112 of the cylinder 15 and having an axis of rotation the same as that for the cylinder 15. The ratchet 110 has four equally spaced engaging teeth 114, the engaging teeth 114 being shaped to engage with the edge of a pawl 116. The pawl 116 is rotatable about axis 118 which is the central axis of a pivot pin 120 which connects the pawl to a pawl carrying lever 122. Pawl 116 is always in contact with the circumference of ratchet 110 because a biasing spring, not shown, which gently forces pawl 116 to rotate about axis 118 toward the ratchet 110.

The pawl carrying lever 122 is generally a flat plate-like structure which is rotatably mounted upon the cylinder shaft 16, thus permitting the pawl carrying lever 122, and the pawl 116 carried thereby, to rotate about the axis of the cylinder shaft 16 while the pawl 116 maintains contact with the circumference of ratchet 110. While the pawl carrying lever 122 is rotating in a counterclockwise direction as shown in FIG. 3, pawl 116 will be engaging one tooth 114 of ratchet 110. This movement of the pawl causes a rotation of the ratchet 110 and hence of the cylinder 15.

Mounted rigidly upon pawl carrying lever 122 is a linkage arm 124 which is rotatably connected by a pivot pin 126 to a connection member 128. Connection member 128 can be in the form of a clevis rigidly attached to the extendable arm or piston rod 130 of a stepping cylinder 132. The stepping cylinder 132 is pivotally connected at 134 to a support member 136 mounted upon one of the side support members 10.

By activating stepping cylinder 132, extendable arm 130 is forced out of the cylinder and moves forwardly causing pawl carryng lever 122 to rotate about the axis of cylinder shaft 16. This rotation of pawl carrying lever 122 causes pawl 116, which is engaged with engaging tooth 114 upon ratchet 110, to rotate about the axis of cylinder shaft 16. Consequently the cylinder 15 is rotated approximately 90° because stepping cylinder 132 extends the arm 130 only far enough to rotate the ratchet 110 approximately 90°. When extendable arm 130 is retracted into the stepping cylinder 132, the pawl carrying lever 122 is rotated in a generally clockwise direction moving pawl 116 to a position where it will engage the next adjacent tooth 114 and permit a subsequent stepping of the stepping cylinder 132 to cause additional rotation of the cylinder 15.

The stepping of stepping cylinder 132 is coordinated with the movement of sliding floor 72. After the raisins from each hopper 26 have been deposited upon the unbaked cookies 54 on the endless belt 52 below the hoppers, sliding floor 72 is returned to a position where each hopper 26 is closed. After the closing of the hoppers 26, the stepping cylinder 132 is activated to rotate cylindrical surface 18 by approximately 90°. This rotation will cause the raisins in the pockets 20 of the cylinder 15 to be discharged into the open topped hoppers 26, and a subsequent movement of moving floor 72 causes the raisins to be deposited upon unbaked cookies 54 on the moving endless belt 52 below each of the hoppers 26.

In order to fully understand how each of the pockets 20 are discharged when the cylinder 15 is rotated to a particular position, reference is made to FIG. 4 an interior view of the cylinder is shown. Each pocket 20 is comprised of a circular wall 138, a pocket bottom 140 and two end walls 142, only one end wall appearing in FIG. 4. Circular wall 138 is a circular surface, the center of the circle being axis 144. The pocket bottom 140 is the outer surface of bottom member 146 which also has a curved end surface 148 formed by a circle having a center along axis 144. Bottom member 146 is rotatably mounted upon a pivot pin 150 centrally mounted along axis 144.

A cam follower arm 152 is rigidly attached to bottom member 146 by screw 154 which passes through cam follower arm 152 and is threadably connected to bottom member 146. A hole 156 is formed adjacent the end of cam follower arm 152 to permit one end of a biasing spring 158 to be connected to the cam follower arm 152, the other end of the biasing spring 158 being attached to a post 160. Biasing spring 158 is a tension spring so that cam follower arm 152 will always be urged into contact with a cam surface 162 as the cylinder 15 is permitted to rotate about its central axis.

Referring briefly to FIG. 5, it can be seen that the cylinder 15 includes an internal section 164 having a hole 166 formed centrally therein through which the shaft 16 passes. A cylindrical bearing 168 is interposed between the hole 166 and the shaft 16 to permit the cylinder body 15 to be freely rotatable about the cylinder shaft 16. The material of bearing 168 might be a nylon or any other durable material which permits the rotating bodies to be freely rotatable with little frictional drag. It will be noted from FIG. 5 that each of the four posts 160 are rigidly attached to circular section 164 permitting the posts 160 to also be freely rotatable about cylinder shaft 16, as the cylinder 15 rotates.

The cam surface 162 is provided as the periphery of a cam member 170, comprised of two generally circular portions, each portion having a different radius, namely, a small radius 172 and a large radius 174. Each radius is generated about the center of cylinder shaft 16, which is also the axis of rotation of the cylinder 15. Located between the essentially circular regions of cam surface 162 are two substantially linear regions 176. By having the cam surface 162 shaped in such a manner, the rotation of the cylinder 15 about cylinder shaft 16 causes movement of the cam follower arms 152 which are maintained in contact with cam surface 162, thus causing movement of the bottom 140 of pockets 20. While bottom member 146 is in the position designated as A in FIG. 4, the associated pocket 20 is fully open permitting the pocket 20 to receive raisins therein. This position of bottom member 178 might best be described as a pick up position as the open pocket will face into hopper 28 and permit raisins to enter the pocket 20. At position A, the cam follower arm 152 is in contact with that portion of cam surface 162 generated about smaller radius 172.

When the bottom member has rotated to the position designated as B in FIG. 4, the bottom member 146 is still in the same position as it was when the bottom member was at the pick up position A. Thus, any raisins within pocket 20 will be retained therein at position B. The cam follower arm 152 at position B is in contact with a flat portion 176 of the cam surface 162.

Upon further rotation of the cylinder 15, the bottom member 146 will move to a position designated as C in FIG. 4, which constitutes the discharge position. At this position, cam follower arm 152 is contacted against that portion of the cam surface 162 generated about the larger radius 174. This causes the bottom member 146 to be rotated about pivot axis 144 until the bottom surface 140 is moved outwardly into a coextensive relation with the remainder of the cylindrical surface 18. As a consequence, the pocket opening is closed and the raisins from the pocket will be discharged therefrom by the pushing exerted by the pocket bottom 140. Finally, upon rotation of the pocket member to the position designated D in FIG. 4, the cam follower arm 152 is again in contact with a flat portion 176 of the cam surface 162 and the biasing spring thus again urges the bottom member 146 inwardly to open the pocket 20.

In order to achieve the aforementioned results, cam member 170 must be fixedly attached to the cylinder shaft 16 so that the cylinder 15 can rotate relatively to the cam member 170. Referring to FIG. 5, it will be seen that a cam support member 180 is rigidly attached to cylindrical shaft 16 by key 186 attached within bore of support member by screw 182. Cam support member 180 has a circular portion encompassing circular shaft 16 and a flange portion extending in a plane perpendicular to the axis of cylindrical shaft 16. Also, a keyway 183 can be formed in the circular portion in alignment with a keyway 184 along the shaft 16 so that a slidable key 186 can be employed to lock the member 180 and shaft 16 together. Cam member 170 is rigidly attached to the flange portion of cam support member 180 by four nuts 188 and bolts 190 which pass through the flange portion of cam support member 180 and through the cam 170 itself.

From the previous description of a preferred embodiment of the present invention, it will be clear that the objects as set out above for this invention have been successfully achieved. The objects are generally achieved by the apparatus of the preferred embodiment wherein a hopper is filled with a plurality of raisins or like articles which are to be dispensed by the apparatus. A cylinder surface with a plurality of pockets therein is positioned so as to permit the raisins from the hopper to fill the pockets in the cylinder. When the cylinder rotates, the filled pockets are ultimately emptied because the bottom of each pocket is movable to force the contents out of each pocket and into an individual hopper positioned above an endless belt. The individual hoppers are opened simultaneously permitting the articles contained therein to fall upon the conveyor belt or upon objects such as unbaked cookies supported by the conveyor belt.

While the foregoing description has been necessarily directed to a preferred embodiment of the present invention, it will be obvious to those skilled in the art that certain modifications can be made to the apparatus described without departing from the spirit and scope of the present invention as defined by the following claims.

What is claimed is:

1. An article dispensing apparatus comprising:
supply means adapted to receive and contain a plurality of discrete articles, said supply means having an outlet;
a rotatable cylinder having a plurality of article-receiving pockets formed therein, said cylinder being positioned adjacent said supply means outlet;
means for rotating said cylinder to move said pockets from a position where said pockets are aligned with said outlet for receiving articles from said supply means to another position where said pockets are remote from said outlet, said remote position constituting a discharge position for said articles;
said pockets having bottoms therein which are pivotally movable toward and away from the surface of said cylinder;
said pocket bottoms including a supporting surface pivotally connected to said cylinder, said surface being rotatable about said connection from an inwardly disposed position to an outwardly disposed position;
means for pivotally moving said pocket bottoms from said inwardly displaced position when said pockets are aligned with said outlet to said outwardly displaced position when said pockets are at said discharge position, said outward movement of said pocket bottoms causing the articles within said pockets to be discharged therefrom; and
receiving means adjacent said discharge position for separately receiving the articles discharged from said pockets.

2. An article dispensing apparatus as defined in claim 1 wherein said means for rotating said cylinder comprises:
a gear means attached to said rotatable cylinder and centered upon the axis of rotation of said cylinder; and
means for intermittently driving said gear means to permit intermittent rotation of said cylinder.

3. An article dispensing apparatus as defined in claim 1 wherein said means for rotating said cylinder comprises:
a ratchet attached to said rotatable cylinder and centered upon the axis of rotation of said cylinder;
a ratchet drive means including a pawl and a pawl carrying lever, said pawl engaging said ratchet when said pawl carrying lever is moved in a first direction, said pawl disengaging from said ratchet when said pawl carrying lever is moved in a second direction, said second direction being opposite said first direction; and
operating means attached to said pawl carrying lever to move said pawl carrying lever alternately in said first direction and then in said second direction, thus permitting said cylinder to intermittently rotate in a single rotational direction about the axis of rotation of said cylinder, said cylinder rotating only when said lever is moved in said first direction.

4. An article dispensing apparatus as defined in claim 3 wherein said operating means is a pneumatic cylinder.

5. An article dispensing apparatus as defined in claim 1 wherein said means for moving said pocket bottom comprises:
a cam means having a cam surface;
a cam follower means attached to the movable bottom of each pocket;
said cam follower means being maintained in constant contact with said cam surface to move said bottoms of said pockets to said outwardly displaced position when said pockets are at said discharge position and additionally to displace said pocket bottoms inwardly prior to alignment of said pockets with said outlet.

6. An article dispensing apparatus as defined in claim 1 further including:
a cam following projecting from said supporting surface; and
an engaging cam in constant contact with said cam follower as said cylinder is rotated, said cam being operative through said cam follower to rotate said supporting surface to its outwardly disposed position when said pockets are at said discharge position, said cam also being operative through said cam follower to permit said supporting surface to rotate to said inwardly disposed position when said pockets are aligned with said outlet.

7. An article dispensing apparatus as defined in claim 1 wherein said receiving means comprises:
a plurality of open topped hoppers, each located below a pocket positioned at said discharge position for receiving articles discharged from said pockets, said open topped hoppers being in fixed alignment with said pockets.

8. An article dispensing apparatus as defined in claim 7 wherein said hoppers include
a discharge control means for each hopper having an open position and a closed position, said open position permitting articles contained within said hoppers to be discharged thereupon and said closed position permitting articles discharged from said pockets to be retained within said hoppers.

9. An article dispensing apparatus as defined in claim 8 wherein said discharge control means comprises a slidable member extending across and comprising the bottom of all said hoppers, said slidable member having a plurality of holes therethrough, and wherein said hoppers each have open bottoms, said holes in said members being spaced apart by a spacing equal to the spacing between said open bottoms, said discharge control means being in said open position when said holes are aligned with said bottoms and being in said closed position when said holes are out of alignment with said bottoms.

10. An article dispensing apparatus as defined in claim 8 further including a carrier means adjacent said hoppers for receiving the articles when said discharge control means is in said open position.

11. An article dispensing apparatus as defined in claim 1 wherein said supply means comprises:
an open topped receptacle with two spaced side walls and two spaced end walls being connected between said side walls and a bottom being connected to one end wall and both side walls and forming said outlet between the other end wall and the edge of said bottom.

12. An article dispensing apparatus as defined in claim 1 further comprising:
an article agitation means positioned inside said supply means to agitate the discrete articles contained within said supply means in a direction parallel to the longitudinal axis of said cylinder.

13. An article dispensing apparatus as defined in claim 12 wherein said article agitation means comprises:
a plurality of substantially linear agitator elements, each such element being attached at one end to a moving element, said moving element extending transversely through said supply means; and
means for intermittently moving said moving element through a predetermined transverse path of motion.

14. An article dispensing apparatus as defined in claim 1 further comprising:
a vibratory means attached to said supply means for vibrating the discrete articles contained therein toward said outlet.

15. An article dispensing apparatus as defined in claim 1 wherein said pocket bottoms are each pivotally mounted to the walls of said pocket at a position adjacent the surface of said cylinder.

16. An article dispensing apparatus comprising:
an open topped supply means for containing a plurality of discrete articles and having connected sides and a bottom portion, said bottom portion partially closing the bottom of said supply means and leaving an unclosed portion forming an outlet;
a rotatable cylinder having a plurality of article-receiving pockets formed therein, said cylinder being positioned adjacent said supply means and having a cylinder axis of rotation;
a gear means attached to said rotatable cylinder and centered upon said cylinder axis of rotation;
an intermittent engaging means for engaging intermittently said gear means for rotating said cylinder from a position where said pockets are aligned with said outlet for receiving discrete articles from said supply means to another position where said pockets are remote from said outlet, said remote position comprising a discharge position for said articles;
said pockets having bottoms pivotally attached to said cylinder and rotatable about a pivot point between a discharge position wherein each bottom is coextensive with the surface of said rotatable cylinder and receiving position wherein each bottom is spaced inwardly from said cylinder surface to form a receptacle for receiving discrete articles from said supply means outlet;
each said pocket bottom having a cam follower arm extending therefrom, said cam follower arm being in constant contact with a surface of a cam positioned about said cylinder axis of rotation, said cam surface being operative upon said cam follower arm to rotate said bottoms to their discharge position when the pocket is positioned at its remote position, said cam surface also being operative upon said cam follower arm to position said bottom in its receiving position when the pocket is positioned adjacent said outlet;
a plurality of open topped hopper means, each hopper being positioned below a pocket positioned at its remote position for receiving discrete articles discharged therefrom; and
a hopper discharge means having an open and a closed position, said closed position permitting articles discharged from said pockets to be held within the hopper and said open position permitting the discharge of articles from within said hopper.

17. An article dispensing apparatus as defined in claim 16 further including an endless conveyor disposed beneath said open-topped hopper means for receiving articles when said hopper discharge means is in its open position.

18. An article dispensing apparatus as defined in claim 17 wherein said articles are moist raisins and wherein said endless conveyor carries unbaked cookies onto which said raisins are deposited.

19. An article dispensing apparatus as defined in claim 1 further including
means for supplying water to the surface of said cylinder along a line parallel to the longitudinal axis of said cylinder for cleaning said surface, and
means, located adjacent said means for supplying, for scraping the surface of said cylinder clean after the water has been supplied thereto.

* * * * *